(12) United States Patent
Melzer

(10) Patent No.: US 10,254,544 B1
(45) Date of Patent: Apr. 9, 2019

(54) HEAD TRACKING ACCURACY AND REDUCING LATENCY IN DYNAMIC ENVIRONMENTS

(71) Applicant: James E. Melzer, Encinitas, CA (US)

(72) Inventor: James E. Melzer, Encinitas, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 88 days.

(21) Appl. No.: 14/710,908

(22) Filed: May 13, 2015

(51) Int. Cl.
*G02B 27/01* (2006.01)

(52) U.S. Cl.
CPC ........ *G02B 27/0172* (2013.01); *G02B 27/017* (2013.01); *G02B 2027/0141* (2013.01)

(58) Field of Classification Search
CPC .............. G02B 27/0172; G02B 27/017; G02B 2027/0141; G02B 2027/0187; G02B 2027/014; G02B 2027/0163; G06T 19/006; H04N 13/044; H04N 5/7491
USPC ............. 359/13–14, 618, 629–633; 345/7–9, 345/632–633; 348/113–120; 349/11
See application file for complete search history.

(56) References Cited

U.S. PATENT DOCUMENTS

| | | | | |
|---|---|---|---|---|
| 7,710,654 B2* | 5/2010 | Ashkenazi | ......... | G02B 27/0093 345/7 |
| 8,237,101 B2* | 8/2012 | Gunning, III | ........... | F41G 3/225 250/203.2 |
| 8,611,015 B2* | 12/2013 | Wheeler | ................ | A61B 3/113 359/13 |
| 2006/0132915 A1* | 6/2006 | Yang | .................. | G02B 27/0093 359/463 |
| 2010/0039380 A1* | 2/2010 | Lanier | .................. | G06F 1/1601 345/156 |
| 2010/0226535 A1* | 9/2010 | Kimchi | .................... | G06F 3/013 382/103 |
| 2015/0338915 A1* | 11/2015 | Publicover | ......... | H04N 5/23229 345/633 |

OTHER PUBLICATIONS

Doshi, Anup et al. "On the Roles of Eye Gaze and Head Dynamics in Predicting Driver's Intent to Change Lanes." IEEE Transactions in Intelligent Transportation Systems (2009): 453-462. Web.*

(Continued)

*Primary Examiner* — Kristina M DeHerrera
(74) *Attorney, Agent, or Firm* — Donna P. Suchy; Daniel M. Barbieri

(57) ABSTRACT

A display system includes a transparent display configured to be worn by a pilot of an aircraft and configured to display information from an image source while allowing the pilot to view a scene, and one or more sensors configured to acquire sensor data indicative of a current orientation and motion of at least one of an eye, a head, and a body portion of the pilot. The display system also includes a controller configured to determine the pilot's current viewpoint of the scene based on the sensor data; determine the pilot's future viewpoint of the scene based on the sensor data and the pilot's current viewpoint of the scene; and cause the image source to provide the display information to the transparent display based on the pilot's determined future viewpoint of the scene to allow the pilot to view the display information and the scene together.

20 Claims, 4 Drawing Sheets

(56) References Cited

OTHER PUBLICATIONS

Gibson, J.J., "The Ecological Approach to Visual Perception", Psychology Press, 1986, 174 pages.

Adelstein, B.D. et al., "Head tracking latency in virtual environments: Psychophysics and a model", Proceedings of the Human Factors and Ergonomics Society Annual Meeting, vol. 47, No. 20, SAGE Publications, Oct. 2003, 5 pages.

Antonio, J.C., "Display content in advanced NVG and HMD systems: a pilot/flight surgeon's concerns", Proceedings of the SPIE: Head- and Helmet-Mounted Displays XIII: Design and Applications, vol. 6955, (Mar. 2008), 10 pages.

Bahill, A.T. et al., "Most naturally occurring human saccades have magnitudes of 15 degrees or less", Investigative Ophthalmology & Visual Science, vol. 14, No. 6, 1975, 2 pages.

Foxlin, E., "Motion tracking requirements and technologies", Handbook of Virtual Environment Technology, Chapter 7, 2002, 54 pages.

Kocian, D.F., "Design considerations for virtual panoramic display (VPD)helmet systems", AGARD Conference Proceedings No. 425, The Man-Machine Interface in Tactical Aircraft Design and Combat Automation, 1987, 33 pages.

Melzer, James E., "HMDs as enablers for situation awareness, the OODA loop and sensemaking", May 2012, SPIE Defense, Security, and Sensing, International Society for Optics and Photonics, 9 pages.

Rogers, S.P. et al., "Effects of system lag on head-tracked cursor control", AeroSense'97, International Society for Optics and Photonics, Jun. 1997, 10 pages.

Rogers, S.P. et al., "Evaluation of earth-fixed HMD symbols using the PRISMS helicopter flight simulator", Proceedings of the SPIE: Helmet-and Head-Mounted Displays IV, vol. 3689, Apr. 1999, 13 pages.

So, R.H.Y. et al., "Feedback-control mechanisms of human behavior", Salvendy, G. Handbook of Human Factors, 1987, 24 pages.

* cited by examiner

HEAD TRACKING ACCURACY AND REDUCING LATENCY IN DYNAMIC ENVIRONMENTS

BACKGROUND

The present disclosure relates to displays. More particularly, the present disclosure relates to a worn display, such as a head-mounted display ("HMD").

A pilot of an aircraft may wear a HMD, such as a helmet-mounted display, that projects information on a display for the pilot. The projected imagery should create a visually coupled system in which the display augments the pilot's view. For example, images or symbols may be overlaid on the display to help the pilot identify objects or locations when looking out the front or side of the aircraft.

Imagery projected on the HMD should preferably be dynamically linked to the orientation of the pilot (e.g., the pilot's head orientation, and/or eye orientation) to create a visually coupled system. In other words, the display should account for the orientation of the pilot in order to accurately display information on the HMD. For example, in situations where the display does not account for the orientation of the pilot, or inaccurately senses the orientation of the pilot, overlaid symbols and imagery may be inaccurate due to latency or otherwise unreliable. Latency between the pilot's actual viewpoint and imagery displayed on the HMD, and the delay in realigning the display configuration, may result in degraded pilot performance. For example, latency may hinder the adaption of pilots to spatial re-arrangements and degrade manual performance, thereby in some instances forcing pilots to slow down to preserve system stability. A delay of even 80 milliseconds from the time the pilot's eyes change position to when the display updates to account for the new position of the pilot's eyes may hinder the pilot's ability to perform a particular task related to tracking an object or location.

A need exists for a visually coupled system having a head orientation tracker (e.g., the controller and sensors) to provide imagery on the display in the correct location and in a timely manner to reduce latency and improve pilot performance. The system and methods describe herein are configured to reduce or completely eliminate latency for a pilot utilizing a wearable display to improve overall pilot performance.

SUMMARY

In one aspect, embodiments of the inventive concepts disclosed herein are directed to a display system. The display system includes a transparent display, one or more sensors, and a controller. The transparent display is configured to be worn by a pilot of an aircraft and configured to display information from an image source while allowing the pilot to view a scene. The one or more sensors are configured to acquire sensor data indicative of a current orientation and motion of at least one of an eye, a head, and a body portion of the pilot. The controller includes at least one processor coupled with a non-transitory processor-readable medium. The controller is configured to determine the pilot's current viewpoint of the scene based on the sensor data; determine the pilot's future viewpoint of the scene based on the sensor data and the pilot's current viewpoint of the scene; and cause the image source to provide the display information to the transparent display based on the pilot's determined future viewpoint of the scene to allow the pilot to view the display information and the scene together.

In a further aspect, embodiments of the inventive concepts disclosed herein are directed to a method for providing display information on a wearable display. The method includes receiving sensor data from one or more sensors configured to acquire sensor data indicative of a current orientation and motion of at least one of an eye, a head, and a body portion of a user; determining the user's current viewpoint of the scene based on the sensor data; determining the user's future viewpoint of the scene based on the sensor data and the user's current viewpoint of the scene; and providing display information based on the user's determined future viewpoint of the scene to a transparent display of the wearable display, the transparent display configured to display information from an image source to allow the pilot to view the display information and the scene together. The display information includes one or more images or symbols.

In another aspect, embodiments of the inventive concepts disclosed herein are directed to a method for viewing and tracking an object or location of interest using a worn display. The method includes receiving, by a controller, sensor data from one or more sensors configured to acquire sensor data indicative of a current orientation and motion of an eye and a head of a user; determining, by the controller, the user's current viewpoint of the scene based on the sensor data; determining, by the controller, the user's future viewpoint of the scene based on the sensor data and the user's current viewpoint of the scene; determining a target of interest in based on a focal point within the user's future viewpoint of the scene; and directing at least one of an aircraft system or an occupant of an aircraft to the target of interest.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
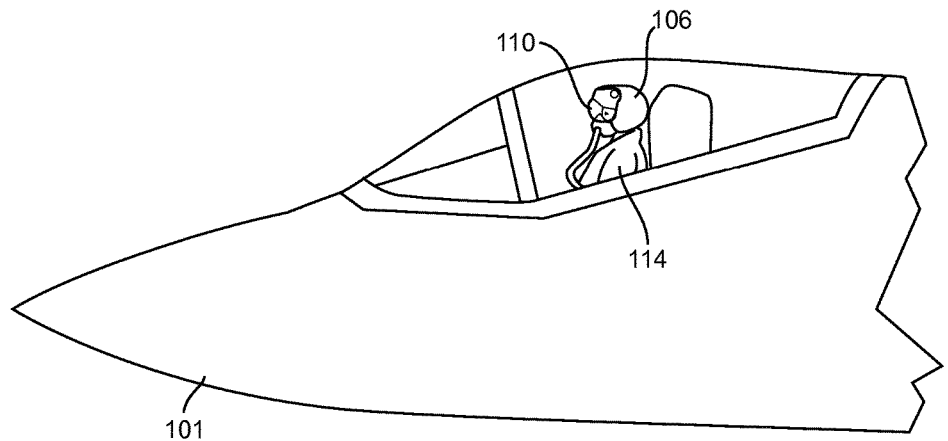
FIG. 1A is a side view schematic illustration of a nose portion of an aircraft having a cockpit occupied by a pilot wearing a head-mounted display, according to an exemplary embodiment.

Before turning to the figures, which illustrate the exemplary embodiments in detail, it should be understood that the inventive concepts disclosed herein are not limited to the details or methodology set forth in the description or illustrated in the figures. It should also be understood that the terminology is for the purpose of description only and should not be regarded as limiting.

Systems and methods according to the inventive concepts disclosed herein can be utilized in a number of control systems for various types of applications, sensing systems, and display systems. For example, in some embodiments, the systems and methods of the present disclosure may be used for a flight display of an aircraft. According to various other exemplary embodiments, the systems and methods of the present disclosure may be used by any system in any other embodiment for controlling the aircraft, controlling systems onboard an aircraft (e.g., navigation systems, weapon systems), rendering computer graphics, and displaying an output (e.g., in another aircraft or spacecraft, a ground-based vehicle, or in a non-vehicle application such as a ground-based display system, air traffic control system, radar system), and so on. While certain examples and embodiments are described with respect to a pilot of an aircraft, it will be appreciated that users other than a pilot may use and benefit from such systems with respect to other vehicles or stationary objects.

Referring to the figures, systems and methods for providing a display on a head-mounted display ("HMD") or other mounted display, such as a helmet-mounted display, are shown and described. More particularly, systems and methods for adjusting a display configuration on the HMD based on the orientation and position of the pilot's eyes, head, and/or body portion are shown and described. For example, as the eyes, head, and/or body portion of the pilot (or other person wearing the HMD) moves, the display may be updated dynamically during such movement based on the pilot's future orientation or viewpoint, which may be predicted based on the current movements of the pilot's eyes, head, and/or body portion. For example, in one embodiment, if the pilot begins to move his or her eyes in a first direction, a subsequent movement of the head and body portion may be predicted and accounted for by the visually coupled system, and the display may be updated to more accurately display information with a reduced latency or without any latency at all. Current HMD systems typically update the display reactive to a movement, which creates a display lag (i.e., latency) where the pilot's has changed their current viewpoint but imagery is displayed based on a previous viewpoint (e.g., the pilots viewpoint from 100 milliseconds ago when the pilot began turning his head or redirecting his eyes).

Imagery may be presented in different frames of reference when being displayed on a HMD, including screen-referenced imagery, aircraft-referenced imagery, and earth-referenced imagery. By using screen-referenced imagery (i.e., imagery presented in the frame of reference of a screen or windshield in front of the pilot), a display is provided that does not require tracking of the pilot's head orientation. For example, images, symbols, and/or text may be displayed that indicate a current status of the aircraft (e.g., altitude, airspeed, fuel status), which do not require tracking the orientation of the pilot. In some embodiments, the screen-referenced imagery maintains a fixed location on the display, and accordingly does not need to be adjusted based on the pilot's viewpoint.

Aircraft-referenced imagery presents imagery in the frame of reference of the aircraft. When using aircraft-referenced imagery, the pilot (or other person) may be seated or positioned a few meters away from the actual location of a sensor configured to detect the position of the pilot. The sensor may be may be located anywhere on the aircraft within a line of sight (i.e., a focal point) of the pilot. For example, in some embodiments, the sensor may be mounted to the nose of the aircraft. The displacement from the nose-mounted sensor to the pilot may cause issues in low level flight or when the pilot turns his or her head 90 degrees to the left or right. In some embodiments, a stabilized wireframe outline of the forward aircraft structure may be shown such that when the pilot looks outward from the aircraft, the aircraft structure is displayed on the HMD.

Earth-referenced imagery (also referred to as geo-referenced imagery) presents imagery in the frame of reference of the earth. When using earth-referenced imagery, objects and locations of interests may be identified, highlighted, and tracked based on their known location on earth. For example, in some embodiments, a runway may be highlighted by the HMD when the runway is in the pilot's line of sight (i.e., focal point) even if cloud coverage prevents the pilot from actually seeing the runway itself. In this way, the HMD generally improves pilot performance by improving waypoint accuracy, landing point accuracy, fire identification accuracy, and generally reduces the overall workload of the pilot in locating and identifying targets or objects of interest.

In some embodiments, the visually coupled system comprises a head orientation tracker that includes one or more sensors for tracking the pilot's eyes and head, and a controller linked to a display system, such as a HMD. The HMD may further comprise a combiner for providing light from a scene and for displaying information from an image source. The visually coupled system allows the pilot to take advantage of a fuller array of information with minimal or no latency by overlaying imagery or symbology on the display reactive to the orientation and movement of the pilot's eyes, head, and a body portion to accurately predict a future viewpoint of the pilot. For example, the visually coupled system expands the pilot's useful field of view by allowing the pilot to turn his or her head and eyes to better perceive the environment while reducing any lag associated with such movement. This provides the pilot more accurate information when looking outside the field of vision of the HUD of the aircraft, and the pilot may then further provide cues to guide or direct attention to specific objects, landmarks, or targets that may or may not be in front of the aircraft. The visually coupled system may further allow the pilot to direct a system of the aircraft, another aircraft, or the attention of a crew member to an object or location, or to bring weapons to bear on a specific target, simply by looking at the object, location, or target. The visually coupled system may further reduce time spent by the pilot looking down at the cockpit (e.g., at controls, monitors), reduce perceptual switching time from the cockpit to the outside world (i.e., having to constantly look back and forth), provide earth- and/or aircraft-referenced imagery, and allowing the pilot to more efficiently be directed to and then track a target of interest.

Referring now to FIG. 1A, a side view schematic illustration of a nose portion of an aircraft 101 is shown, according to an exemplary embodiment. As shown, a pilot 114 occupies a cockpit of the aircraft 101 and is wearing a head-mounted display ("HMD") 106 having a display screen 110. While the HMD 106 is described for use in an aircraft in the present disclosure, it should be understood that the systems and methods herein may be applicable to other environments. The HMD 106 may be any type of heads up display system and may be utilized in various applications, including but not limited to aviation, traffic control, medical, naval, targeting, ground based, military, and other applications.

Figure 1B:
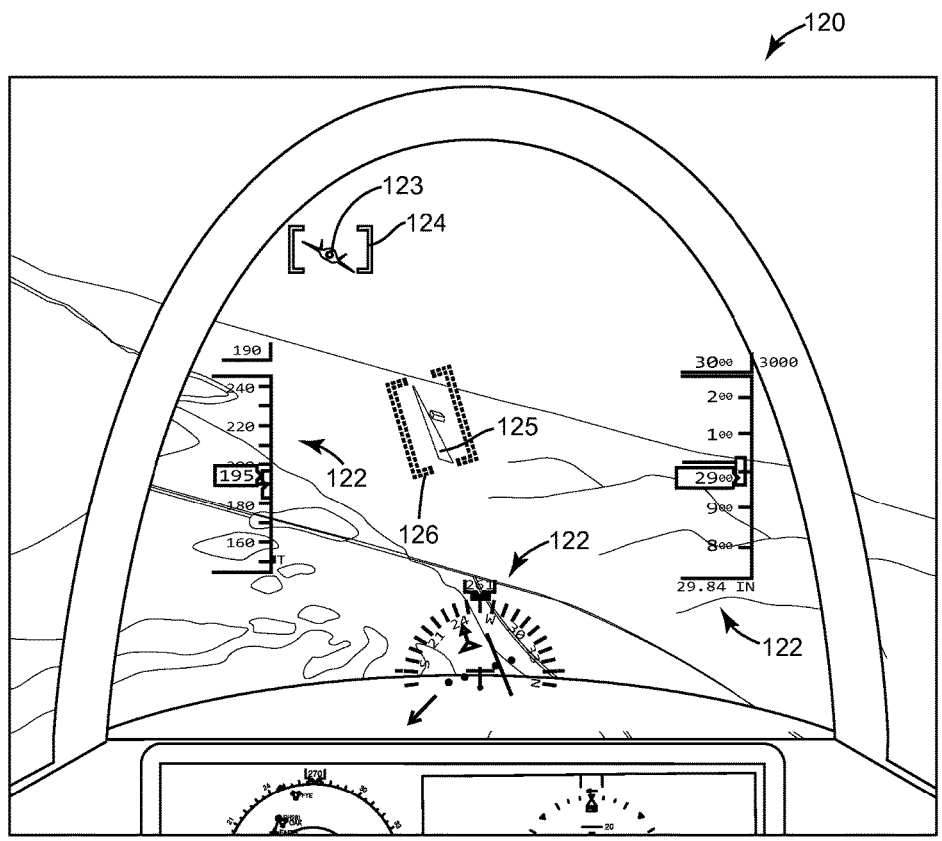
FIG. 1B is a perspective view schematic illustration of an exemplary viewpoint of the pilot through the head-mounted display of FIG. 1A.

Referring now to FIG. 1B, a perspective view schematic illustration of an exemplary viewpoint 120 of the pilot 114 through the HMD 106 of FIG. 1A is shown. The display screen 110 may be fully transparent or semi-transparent to allow the pilot 114 to view a scene along with display information. In one embodiment, the display information includes screen-referenced imagery 122. For example, the screen referenced imagery 122 may include information relating to the aircraft's position, speed, altitude, and heading, weather information, or any other information that is desirable to display in a fixed position on the display screen 110. In one embodiment, the display information includes aircraft-referenced imagery 124. For example, in some embodiments, the aircraft-referenced imagery 124 may include a target indicator for a weapons system to indicate the position of another aircraft 123 in reference to the aircraft 101. In one embodiment, the display information includes earth-referenced imagery 126. For example, the earth-referenced imagery 126 may highlight objects of interest, such as runway 125, based on the object's known location on earth.

Figure 2A:
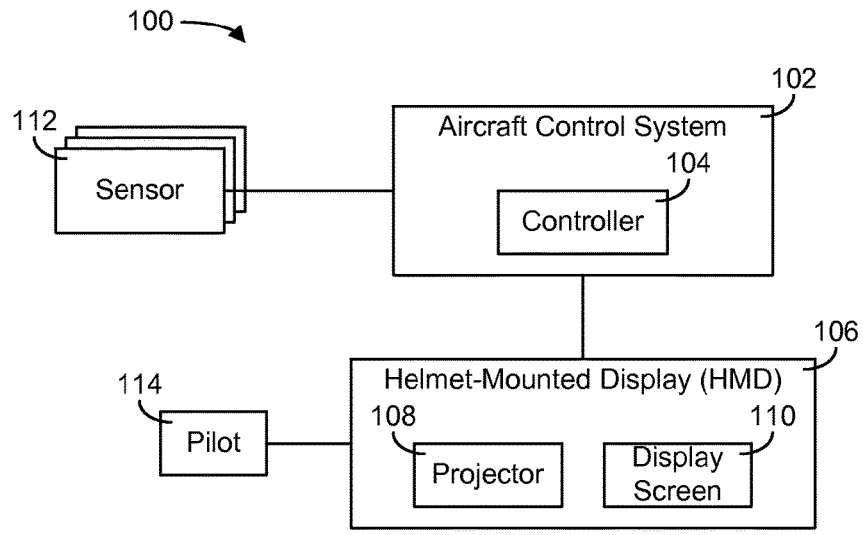
FIG. 2A is a block diagram of a visually coupled system including a controller and a helmet-mounted display, according to an exemplary embodiment.

Referring now to FIG. 2A, a block diagram of a visually coupled system 100 including an aircraft control system 102, the HMD 106, and a plurality of sensors 112 is shown, according to an exemplary embodiment of the inventive concepts disclosed herein. The aircraft control system 102 may be a system responsible for general aircraft control and features, and may include any number of aircraft subsystems, controllers, and other components for general aircraft functionality. The aircraft control system 102 includes a controller 104 configured to provide information for display on the HMD 106. In some embodiments, the visually coupled system 100 may comprise an image generator. For example, an image generator may generate images for use of the visually coupled system in a simulator system, such as an aircraft flight simulator.

Figure 2B:
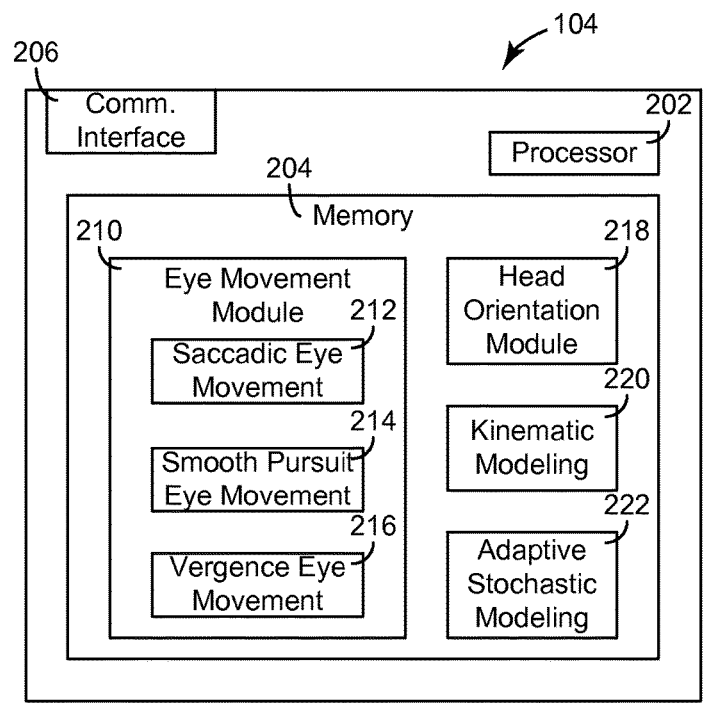
FIG. 2B is a detailed block diagram of the controller of the visually coupled system, according to an exemplary embodiment.

The plurality of sensors 112 may be located in various positions on the aircraft 101. The sensors 112 may generally be configured to detect an orientation of the pilot 114. For example, the sensors 112 may track the location and movement of the eyes, head, and/or a body portion of the pilot 114. For example, the sensors 112 may be configured to monitor or otherwise track movement of the pilot's neck, shoulders, arms, torso, and the like. In one embodiment, one or more sensors 112 may utilize infrared or other light to detect the area where the pupil of an eye of the pilot 114 is looking. In some embodiments, the sensors 112 may be part of a head tracking system, or may be or include an inward facing eye tracker, or a pupil sensor that provides eye box position information. The sensors 112 may track the location and movement of a single eye or both eyes. The sensors 112 may provide a sensor input to the controller 104, which may determine one or more properties related to movements made by the pilot 114, as shown in FIG. 2B. For example, the sensors 112 may track eye and head movement, and the controller 104 may be able to determine the type of movement and therefore predict a subsequent movement.

The HMD 106 may include a projector 108. The projector 108 may be any type of projector configured for projecting rays of light into a waveguide or onto the display screen 110, and is configured to provide imagery or symbology on the display screen 110. The display screen 110 may be a semi-transparent or fully transparent display that displays information from the projector 108 while still allowing a wearer of the HMD 106 to view an outside scene. The display screen 110 may include a combiner in some embodiments. For example, the display screen 110 may receive light from a scene and display information from an image source such as the projector 108, and then combine both the received light and the display information such that the pilot 114 is able to view both the outside scene and the display information together. In some embodiments, the display information may be overlaid on the outside scene.

Referring now to FIG. 2B, a detailed block diagram of the controller 104 of the visually coupled system 100 is shown, according to an exemplary embodiment. The controller 104 may include a processing circuit including a processor 202, a memory 204, and a communications interface 206 facilitating communications with the one or more sensors 112 and the HMD 106 of the visually coupled system 100. The processor 202 may be coupled with the memory 204, which may comprise a non-transitory processor-readable medium. The processor 202 may be implemented as a specific purpose processor, an application specific integrated circuit (ASIC), one or more field programmable gate arrays (FPGAs), a group of processing components, or other suitable electronic processing components. Any controllers and modules described herein may be implemented as a hardware circuit comprising custom VLSI circuits or gate arrays, off-the-shelf semiconductors such as logic chips, transistors, or other discrete components, and may be implemented in programmable hardware devices such as field programmable gate arrays, programmable array logic, programmable logic devices or the like. The Memory 204 is one or more devices (e.g., RAM, ROM, flash memory, hard disk storage) for storing data and/or computer code for completing and/or facilitating the various user or client processes, layers, and modules described in the present disclosure. The memory 204 may be or include volatile memory or non-volatile memory and may include database components, object code components, script components, or any other type of information structure for supporting the various activities and information structures of the present disclosure. The memory 204 is communicably connected to the processor 202 and includes computer code or instruction modules for executing one or more processes described herein.

The communications interface 206 may be configured to receive sensor input from the one or more sensors 112, and to communicate information to the HMD 106 via a wired or wireless connection. The communications interface 206 may include any type of wired or wireless technology for facilitating communications, including electronic and optical communication protocols.

The memory 204 is shown to include various modules for determining properties related to pilot orientation and movement. For example, the memory 204 is shown to include an eye movement module 210 configured to determine a type of eye movement detected by the one or more sensors 112. As described above, the one or more sensors 112 may generally be configured to determine where the pilot 114 is looking based on, for example, the position of the pupils of the eyes of the pilot 114. In some embodiments, the one or more sensors 112 are configured to acquire sensor data indicative of a current orientation and motion of eyes, a head, and a body portion of the pilot 114. The eye movement module 210 may compare the orientation and position of the eyes of the pilot 114 to a previous orientation and position, and determine whether the eyes have moved to look in a different area, and if so, in what manner the eyes moved to the different area.

In one embodiment, the eye movement module 210 may determine the type of eye movement. For example, the eye movement module 210 may determine that a saccadic eye movement 212 has occurred. The saccadic eye movement 212 may be indicative of a quick, simultaneous movement of both eyes in the same direction. The saccadic eye movement 212 may be relatively significant (e.g., up to 1000 degrees of movement per second). As a result of the saccadic eye movement 212, the head will typically change position corresponding to the change in eye position. More particularly, the saccadic eye movement 212 may be indicative of when the head movement will occur and where the head will be pointing, especially if the eyes move more than 15 to 20 degrees from pointing forward. In some instances, the saccadic eye movement 212 may indicate that a head movement will occur once the eyes start to counter-rotate to bring an object of interest into view (i.e., an "eyes forward in the head" orientation) when the head stops moving.

According to another example, the eye movement module 210 may determine that a smooth pursuit eye movement 214 has occurred. The smooth pursuit eye movement 214 may be indicative of the eyes closely following a moving object (e.g., simultaneously tracking the object). As a result of the smooth pursuit eye movement 214, the head of the pilot 114 will likely slowly track the eye movement as the pilot 114 maintains an "eyes forward in the head" orientation (i.e., pointing their nose and eyes in the same direction and not looking out of the corner of their eye).

According to another example, the eye movement module 210 may determine that a vergence eye movement 216 has occurred. The vergence eye movement 216 is indicative of the eyes converging inward or diverging outward to binocularly fixate on an object or location. As a result of the vergence eye movement 216, the pilot 114 will likely transfer attention, and therefore his or her head and body portion orientation, in the direction of the object or location. For example, if the eyes of the pilot 114 converge inward on a control panel in the cockpit interior, the head and body portion of the pilot 114 will typically orient towards the same control panel. In some embodiments, the visually coupled system 100 may detect, by using the eye movement module 210, other types of eye movements besides from or in addition to saccadic, smooth pursuit, and vergence movements, such as vestibule-ocular movements, among others.

Once the type of eye movement is determined, a future orientation or viewpoint of the pilot 114 may be determined. Under natural viewing conditions, eye and head orientation is a complex behavior involving the eye and head motor systems. Under such viewing conditions, a person prefers to maintain a "head forward" condition relative to body portion orientation and an "eyes forward" condition relative to head orientation. If the eyes attempt to locate an object or location of interest more than a threshold (e.g., 10-15 degrees) off center, a head motion is typically elicited to try and bring the eye and head combination into an "eyes forward" orientation.

Therefore, when an eye movement is detected by the eye movement module 210, a corresponding head movement may be predicted. In some embodiments, a future viewpoint may be determined based on a detected eye movement and a detected head movement. In some embodiments, the future viewpoint may be determined based a detected eye movement, a detected head movement, and a detected movement of a portion of the body of the pilot 114. The memory 204 is shown to include a head orientation module 218 configured to estimate the head movement based on the eye movement.

Figure 3:
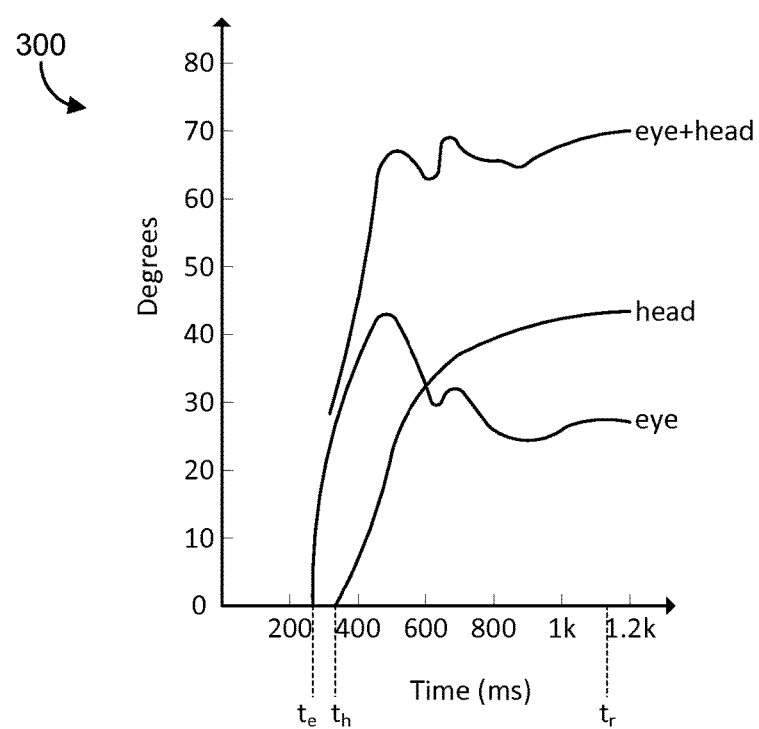
FIG. 3 is a graph illustrating an eye and head movement, for which the visually coupled system is configured to provide a display that accounts for the eye and head movement, according to an exemplary embodiment.

Referring now to FIG. 3, a graph 300 illustrating an example coordinated eye and head movement is shown. The combination of the eye and head orientation may be referred to as the user's "gaze." In one common form of gaze, under natural viewing conditions, the person may desire to view an object that is somewhat eccentric (e.g., off-center) from the "eyes forward" and "head forward" orientations of the person. For example, assume that the pilot 114 begins to look towards an object of interest at a position off-center from the current viewpoint of the pilot 114. At a time $t_e$, the eyes of the pilot 114 may move laterally towards the object of interest. The object of interest may be somewhat eccentric (e.g., about 70 degrees eccentric as shown in FIG. 3). At a time $t_h$ after time $t_e$, the head of the pilot 114 begins to follow the eye direction. The delay between $t_h$ and $t_e$ may be a relatively short delay representing a simple reaction time (e.g., approximately 66 milliseconds). A short time later (e.g., approximately 250 milliseconds), the eyes start to counter-rotate, the eyes slightly overcorrect, and then continue to adjust until a time $t_r$ when the position of the head and eyes stabilize (e.g., at about 70 degrees eccentric, matching the location of the object of interest). As shown in FIG. 3, the eye orientation of the pilot 114 adjusts over time, as the eyes counter-rotate to adjust for the new head orientation, to a new position approximately 30 degrees offset from the original (or current) viewpoint of the pilot 114. The head orientation is shown to adjust to a position approximately 40 degrees offset from the original viewpoint of the pilot 114. The combination of the two positions results in the approximately 70 degrees offset required to properly view the object of interest.

Referring back to FIG. 2B, in some embodiments, the head orientation module 218 is configured to estimate the head motion in response to the eye motion. For example, if the one or more sensors 112 detect a saccadic eye movement 212, the head orientation module 218 may predict when the head movement will occur, as the head movement will likely occur relatively quickly after a quick eye movement. Based on the detected saccadic eye movement 212, the head orientation module 218 may further estimate the final head position and the position of the head as it transitions from its original position to the new position to determine a future viewpoint of the user.

The head orientation module 218 is typically configured to predict a future movement and future orientation, which indicates a future viewpoint of the user, by using a model-based approach based on the combination of current movements of the head and neck. In other words, the head orientation module 218 may be configured to combine the movements of the head, neck, and body portion of the pilot 114 into a single predicted orientation and position of the pilot 114 indicating a future viewpoint. In one embodiment, additional information may be used in addition to the pilot's eye, head, and body portion orientation and position. For example, specific kinematic modeling 220 may be used in combination with the sensed information to predict a future orientation and position of the pilot 114. The kinematic modeling 220 may be based on at least the motion of the eyes, head, and body portion of the pilot 114, in some cases without considering the cause of the motion (e.g., looking at a target). As another example, adaptive stochastic modeling 222 may be used in combination with the sensed motion of the eyes, head, and body portion of the pilot 114 to predict a future orientation and position of the pilot 114. The adaptive stochastic modeling 222 may be based on previous behaviors of the pilot 114 (e.g., previous positions, orientations, and other such variables) and may track the evolution of the pilot's behavior to better predict future behavior. In some embodiments, the modeling systems may learn from the user's previous behaviors, including the user's previous head, eye, and body movements and how each movement relates to one another, to tailor the modeling for that particular user. Upon learning the common movements of a particular user, the visually coupled system 100 may provide more accurate display renderings having less latency when the user moves their eyes and/or head to a new viewpoint. In some embodiments, such modeling may be used as a noise dampening function, thereby reducing the impact of any noise or other abnormalities in acquired sensor readings.

Figure 4:
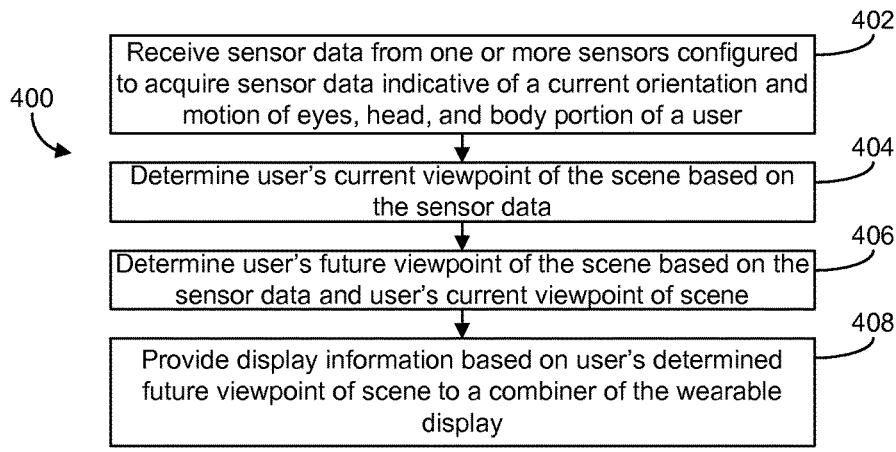
FIG. 4 is a flow diagram of a process for providing an output for display on the helmet-mounted display, according to an exemplary embodiment.

Referring now to FIG. 4, a flow diagram of a process 400 for providing an output for display on the HMD 106 is shown, according to an exemplary embodiment. The process 400 may be executed by, for example, the controller 104. The process 400 may generally be executed for providing imagery on the display 110 of the HMD 106 to overlay the imagery on the field of view of the pilot 114.

The process 400 includes receiving sensor data from one or more sensors configured to acquire sensor data indicative of a current orientation and motion of eyes, a head, and a body portion of a user, such as the pilot 114 (402). The sensor input relates to the orientation and position of the eyes of the user, and is indicative of a current viewpoint of the user. In some embodiments, the sensor input may further include a current orientation or position of the head or body portion of the user. The process 400 further includes determining the user's current viewpoint of the scene based on the sensor data (404). For example, determining the user's current viewpoint of the scene may be based on determining the current orientation and position of the eyes of the user, or determining an object or location of interest on which the user is focusing. The process 400 further includes determining the user's future viewpoint of the scene based on the sensor data and the user's current viewpoint of the scene (406). For example, determining the user's future viewpoint of the scene may take into account the user's current viewpoint of the scene and the user's eye and head movement. In some embodiments, determining the user's future viewpoint of the scene may further include modeling the user's future movements and orientation based on the user's current eye and head movements.

In one embodiment, determining the user's current viewpoint of the scene and determining the user's future viewpoint of the scene include identifying the type of eye movement sensed. For example, the sensed eye movement may be a saccadic eye movement, a smooth pursuit eye movement, or a vergence eye movement, each of which corresponding with a different type of head and eye movement, and typically indicative of a different future viewpoint. For example, a saccadic eye movement may be indicative of the head and body portion suddenly adjusting. In another example, a smooth pursuit eye movement may be indicative of the position of the head and body portion gradually changing. In some embodiments, determining the user's current viewpoint may include determining the end position of the eyes, head, and body portion of the user.

The process 400 further includes providing display information based on the user's determined future viewpoint of a scene to a combiner of the wearable display, the combiner configured to provide light from the scene and the display information to the user to allow the user to view the display information and the scene together, wherein the display information includes one or more images or symbols (408). For example, in some embodiments, the display information may be provided to a HMD worn by the pilot 114 or co-pilot of the aircraft 101. The information displayed on the HMD is typically adjusted to account for movements that the user makes. The display information may include one or more images or symbols overlaid on the scene. For example, if the user is looking at an object or location of interest, one or more images or symbols may be displayed to highlight the object or location. The position of the images or symbols with respect to the user's viewpoint may be updated to account for movement or repositioning of the user. For example, upon detecting a smooth pursuit eye movement, the position of the images and symbols may be gradually changed over time to correspond with the gradual movement of the pilot's eye and head with little to no latency. As another example, upon detecting a saccadic eye movement in which a sudden movement is experienced, the position of the images and symbols may be changed in such a way that the field of vision of the pilot 114 is stabilized as the eyes and head suddenly adjust to a new position (i.e., the change occurs such that the pilot 114 can more easily locate the object or location during a sudden change).

Visually coupled systems according to some embodiments of the inventive concepts disclosed herein may generally be used to allow the pilot 114 or other user wearing the HMD 106 to view and track an object or location of interest. For example, the visually coupled system may enable a user to direct an aircraft system (e.g., a weapons system), another aircraft, or another crew member to an object or location of interest.

Figure 5:
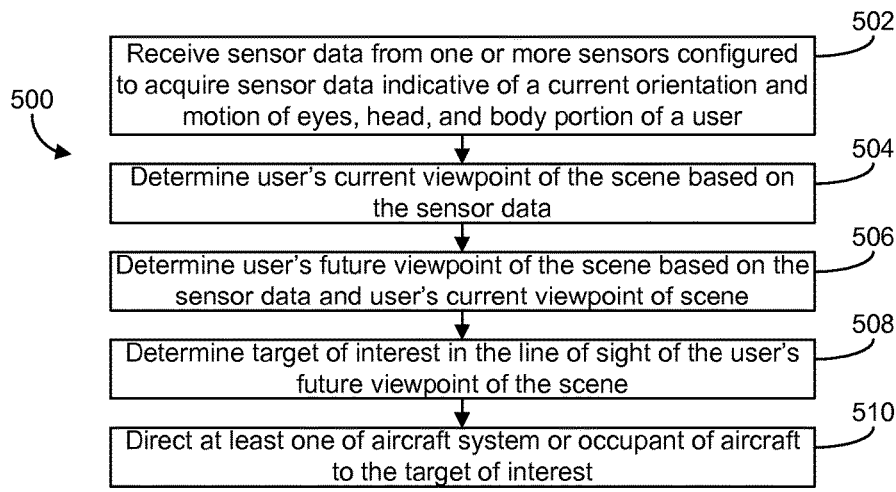
FIG. 5 is a flow diagram of a process for using a visually coupled system to view and track an object or location of interest, according to an exemplary embodiment.

Referring now to FIG. 5, a flow diagram of a process 500 for using a visually coupled system to view and track an object or location of interest is shown, according to an exemplary embodiment. The process 500 includes receiving, by a controller, sensor data from one or more sensors configured to acquire sensor data indicative of a current orientation and motion of eyes, a head, and a body portion of a user (502). The process 500 further includes determining, by the controller, the user's current viewpoint of the scene based on the sensor data (504). The process 500 further includes determining, by the controller, the user's future viewpoint of the scene based on the sensor data and the user's current viewpoint of the scene (506). For example, determining the user's future viewpoint of the scene may include determining an object or location of interest that the user is viewing or moving to view. The object or location of interest may be identified based on the orientation and position of the user, or may be identified in combination with information from other aircraft subsystems (e.g., radars or sensors configured to detect objects around the aircraft 101, navigation systems, weapons systems). In another example, determining a target of interest in the line of sight (i.e., focal point) of the user's future viewpoint of the scene may include determining a specific off-boresight target to aim a weapons system of the aircraft 101 towards. The process 500 further includes directing at least one of an aircraft system or an occupant of an aircraft to the target of interest (508). For example, an air traffic controller may direct the attention of the pilot 114 of the aircraft 101 toward a destination or around a hazard area (e.g., thunderstorm, volcano cloud, high-turbulence area). In another example, a pilot of a military aircraft may direct the attention of a co-pilot of the military aircraft, or the pilot or co-pilot of another aircraft or ground system, to target an unfriendly aircraft, vehicle, or facility.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on machine-readable media capable of accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a special purpose computer or other special purpose machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a special purpose computer or other special purpose machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a special purpose computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A display system, comprising:
    a transparent display configured to be worn by a pilot of an aircraft and configured to display information from an image source while allowing the pilot to view a scene;
    one or more sensors configured to acquire sensor data indicative of a current orientation and motion of an eye of the pilot and a current orientation and motion of at least one of a head and a body portion of the pilot; and
    a controller comprising at least one processor coupled with a non-transitory processor-readable medium, the controller configured to:

determine the pilot's current viewpoint of the scene based on the sensor data;

determine the pilot's future viewpoint of the scene at a third point in time based on the sensor data and the pilot's current viewpoint of the scene, wherein determining the pilot's future viewpoint of the scene is based on a time difference between an initiation of the motion of the eye of the pilot at a first point in time prior to the third point in time and an initiation of the motion of the at least one of the head and the body portion of the pilot at a second point in time subsequent to the first point in time and prior to the third point in time; and cause the image source to provide the display information to the transparent display based on the pilot's determined future viewpoint of the scene to allow the pilot to view the display information and the scene together.

2. The system of claim 1, wherein the sensor data is indicative of a saccadic eye movement, and wherein the saccadic eye movement indicates when the head of the pilot will move and a future head orientation of the pilot.

3. The system of claim 1, wherein the sensor data is indicative of a smooth pursuit eye movement, and wherein the smooth pursuit eye movement indicates that the eye of the pilot will smoothly follow an object.

4. The system of claim 1, wherein the sensor data is indicative of a vergence eye movement, and wherein the vergence eye movement indicates that the eye of the pilot will converge to a close in or farther out point.

5. The system of claim 1, wherein the controller is further configured to model future orientation and motion of the eye, the head, and the body portion of the pilot to determine the pilot's future viewpoint of the scene, and wherein modeling comprises adaptive stochastic modeling.

6. The system of claim 1, wherein the display information is projected on the transparent display to assist the pilot in locating and tracking a target of interest.

7. The system of claim 1, wherein the display information comprises aircraft-referenced imagery.

8. The system of claim 1, wherein the display information comprises earth-referenced imagery.

9. A method for providing display information on a wearable display, comprising:

receiving, by a processor, sensor data from one or more sensors configured to acquire sensor data indicative of a current orientation and motion of an eye of a user and a current orientation and motion of at least one of a head and a body portion of the user;

determining, by the processor, the user's current viewpoint of a scene based on the sensor data;

determining, by the processor, the user's future viewpoint of the scene at a third point in time based on the sensor data and the user's current viewpoint of the scene, wherein determining the user's future viewpoint of the scene is based on a time difference between an initiation of the motion of the eye of the user at a first point in time prior to the third point in time and an initiation of the motion of the at least one of the head and the body portion of the user at a second point in time subsequent to the first point in time and prior to the third point in time; and providing, by the processor, display information based on the user's determined future viewpoint of the scene to a transparent display of the wearable display, the wearable display configured to be worn by the user in a cockpit of an aircraft, the transparent display configured to display information from an image source to allow the user to view the display information and the scene together, wherein the display information includes one or more images or symbols.

10. The method of claim 9, wherein providing the display information includes changing position of one or more images or symbols based on the user's future viewpoint.

11. The method of claim 9, wherein providing the display information includes dynamically changing position of one or more images or symbols to correspond with a future predicted movement of the user.

12. The method of claim 9, wherein the sensor data is indicative of a saccadic eye movement, and wherein the saccadic eye movement indicates when the head of the user will move and a future head orientation of the user.

13. The method of claim 9, wherein the sensor data is indicative of a smooth pursuit eye movement, and wherein the smooth pursuit eye movement indicates that the eye of the user will smoothly follow an object.

14. The method of claim 9, wherein the sensor data is indicative of a vergence eye movement, and wherein the vergence eye movement indicates that the eye of the user will converge to a close in or farther out point.

15. The method of claim 9, further comprising modeling future orientation and motion of the eye, the head, and the body portion of the user to determine the user's future viewpoint of the scene, and wherein modeling comprises at least one of kinematic modeling and adaptive stochastic modeling.

16. The method of claim 9, wherein the one or more images or symbols are configured to assist the user in locating a target of interest and tracking the target of interest.

17. The method of claim 9, wherein the display information comprises aircraft-referenced imagery.

18. The method of claim 9, wherein the display information comprises earth-referenced imagery.

19. A method for viewing and tracking an object or location of interest using a worn display, comprising:

receiving, by a controller, sensor data from one or more sensors configured to acquire sensor data indicative of a current orientation and motion of an eye and a head of a user;

determining, by the controller, the user's current viewpoint of a scene based on the sensor data;

determining, by the controller, the user's future viewpoint of the scene at a third point in time based on the sensor data and the pilot's current viewpoint of the scene, wherein determining the pilot's future viewpoint of the scene is based on a time difference between an initiation of the motion of the eye of the pilot at a first point in time prior to the third point in time and an initiation of the motion of the at least one of the head and the body portion of the pilot at a second point in time subsequent to the first point in time and prior to the third point in time;

determining a target of interest based on a focal point within the user's future viewpoint of the scene; and directing at least one of an aircraft system or an occupant of an aircraft to the target of interest by providing display information to a transparent display of the worn display, the worn display configured to be worn by the user in a cockpit of the aircraft.

20. The method of claim 19, wherein the sensor data is indicative of at least one of a saccadic eye movement, a smooth pursuit eye movement, and a vergence eye movement, and wherein the aircraft system comprises at least one of an aircraft navigation system and an aircraft weapons system.

* * * * *